June 20, 1961 H. J. MUMMA 2,989,168
MACHINE FOR HANDLING EGGS
Original Filed Dec. 28, 1953 6 Sheets-Sheet 3
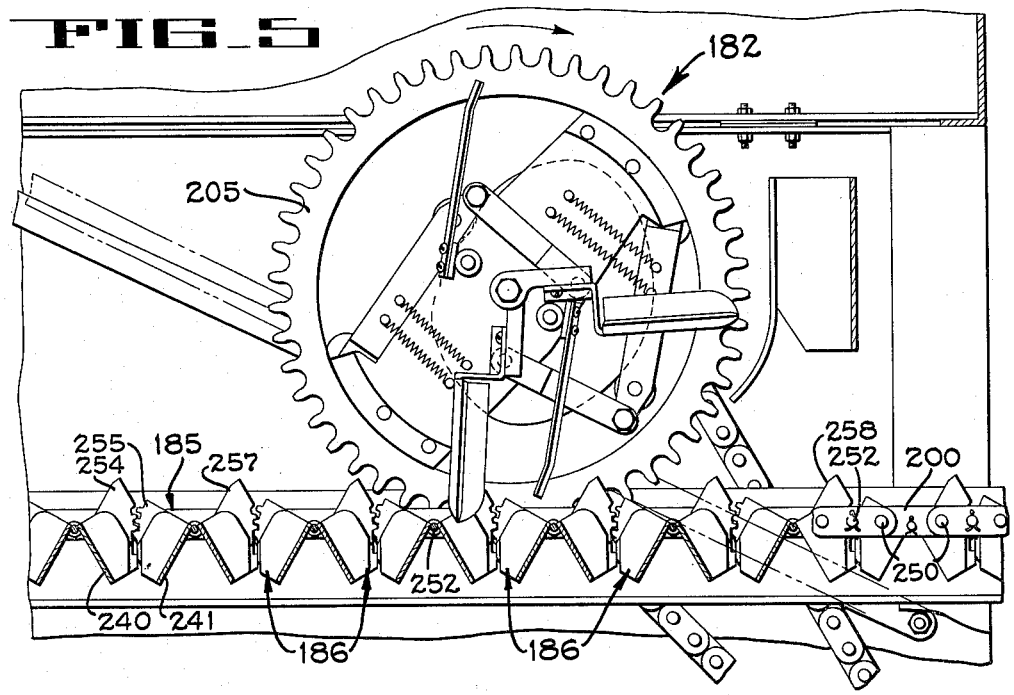
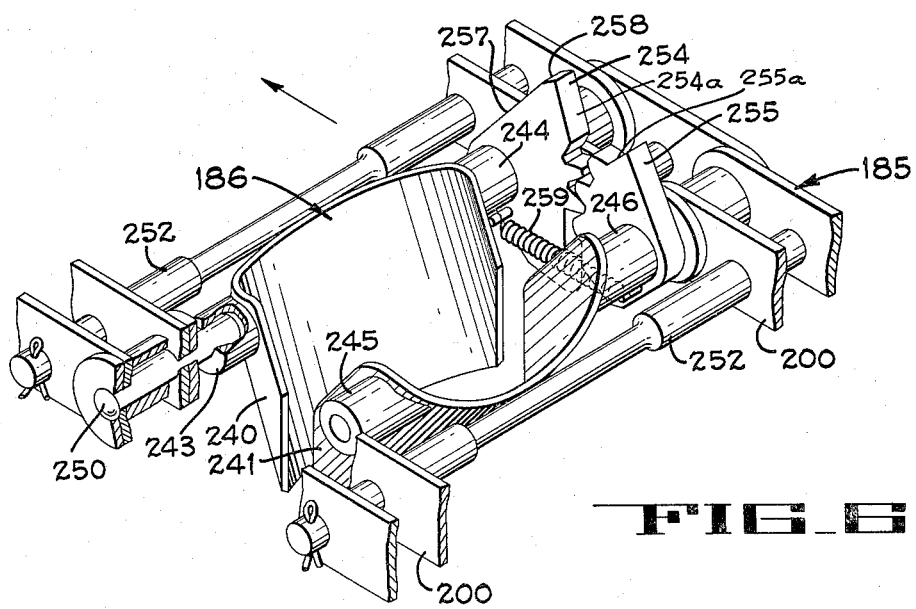
INVENTOR
HAROLD J. MUMMA
BY
ATTORNEY

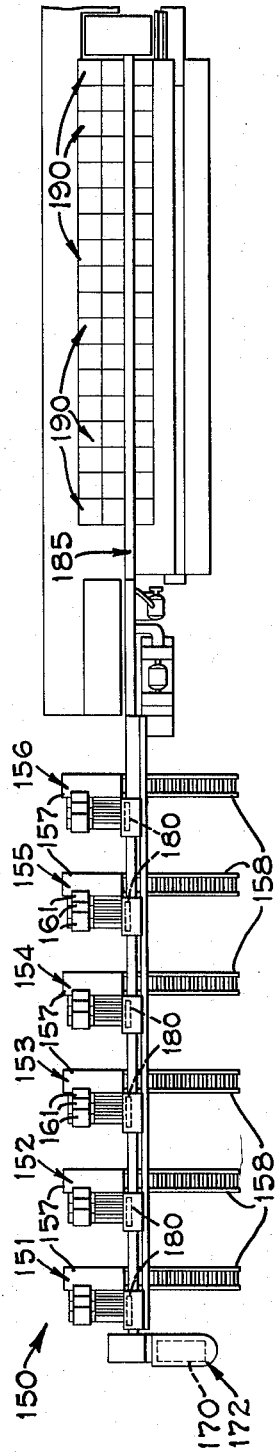
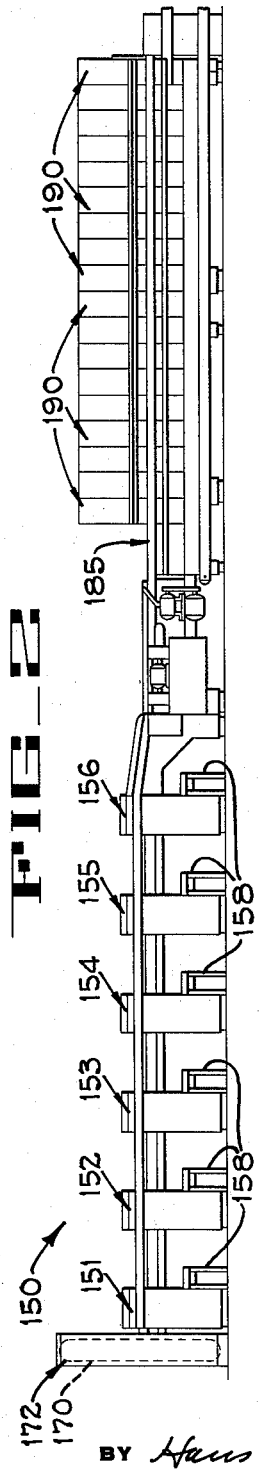
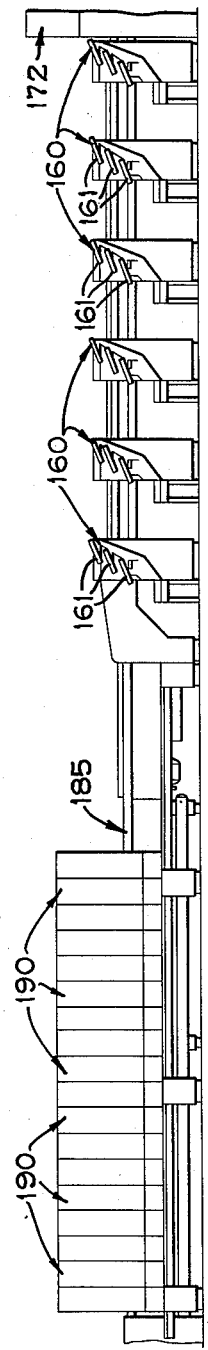
INVENTOR
HAROLD J. MUMMA

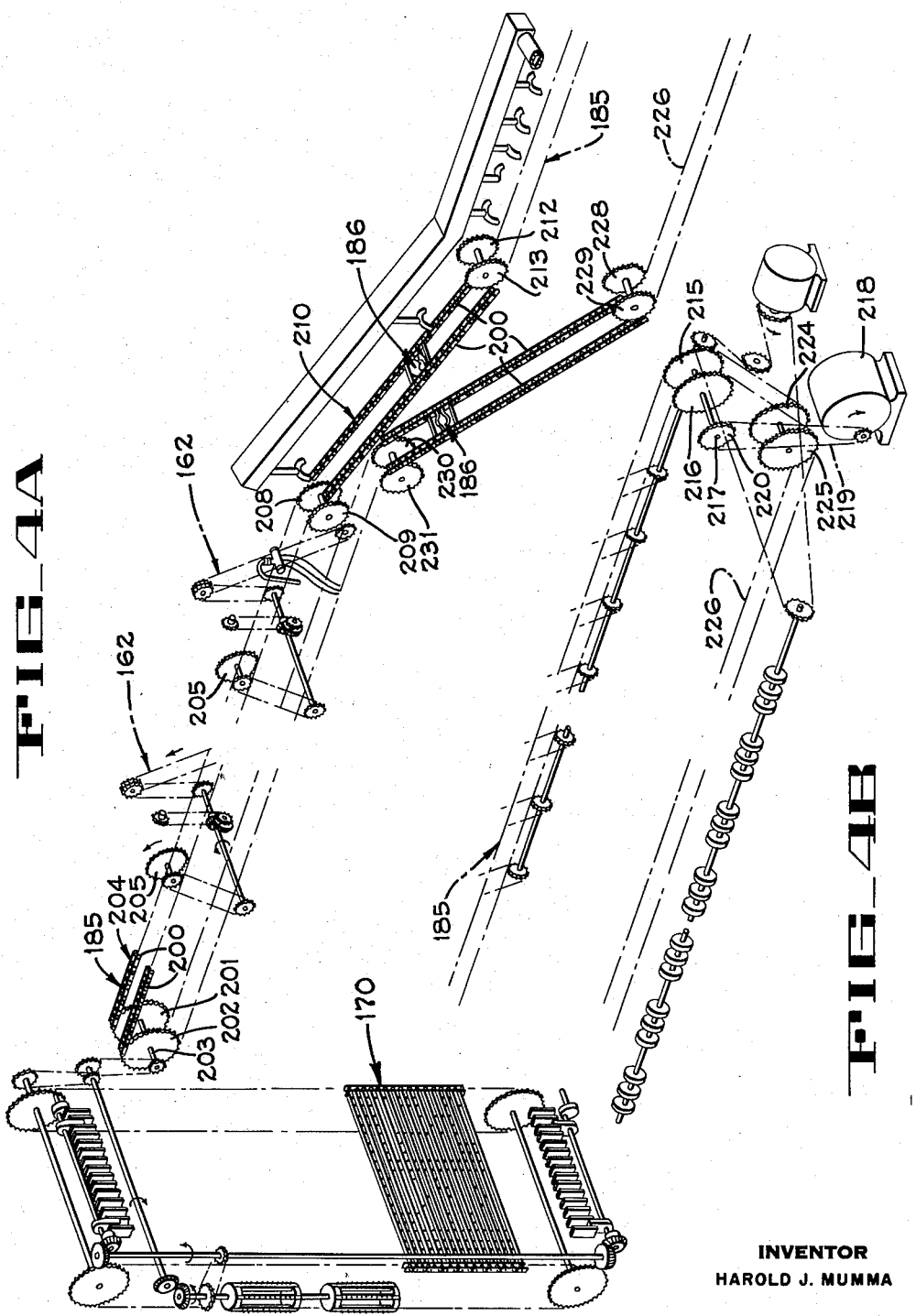

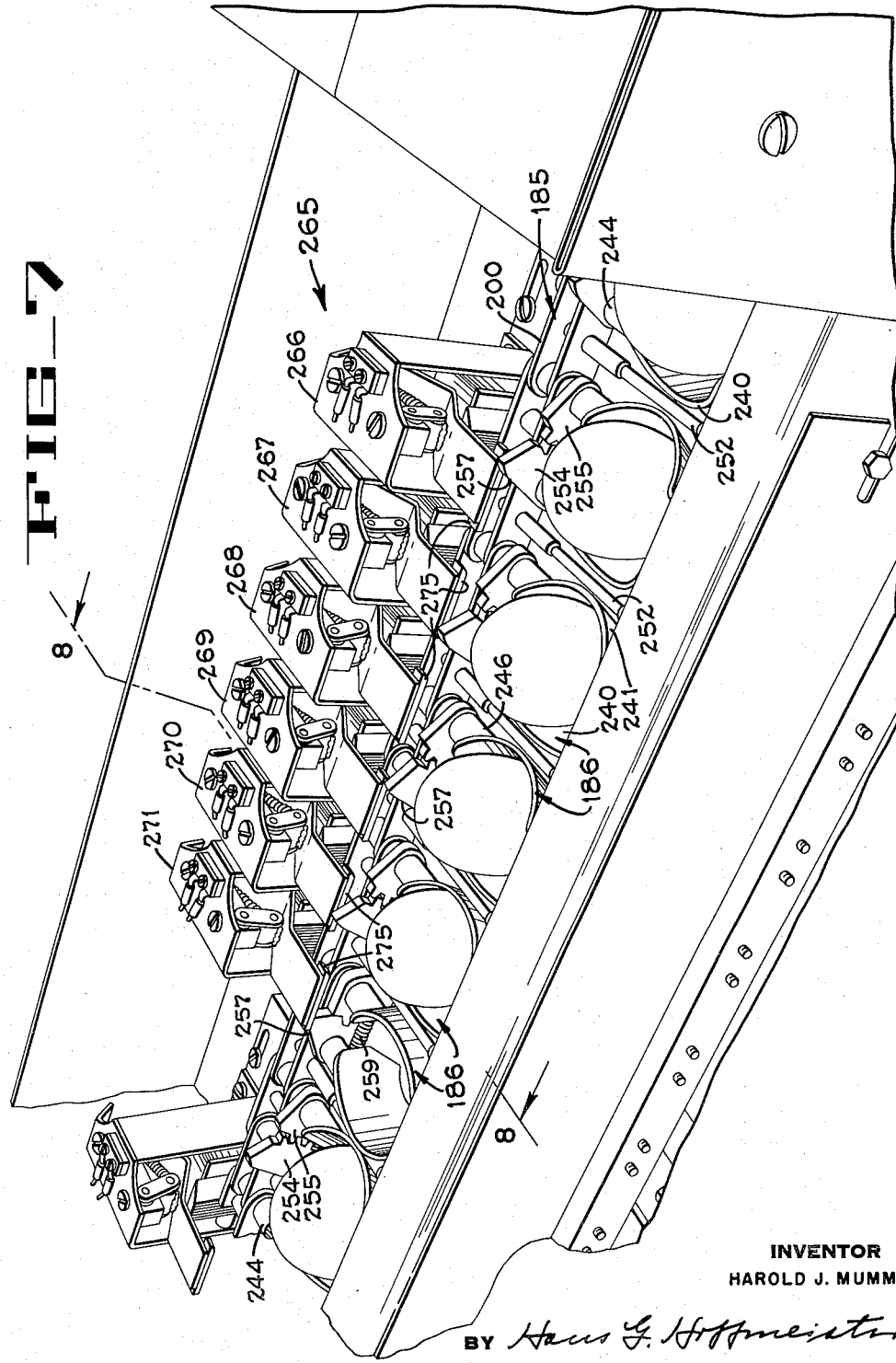

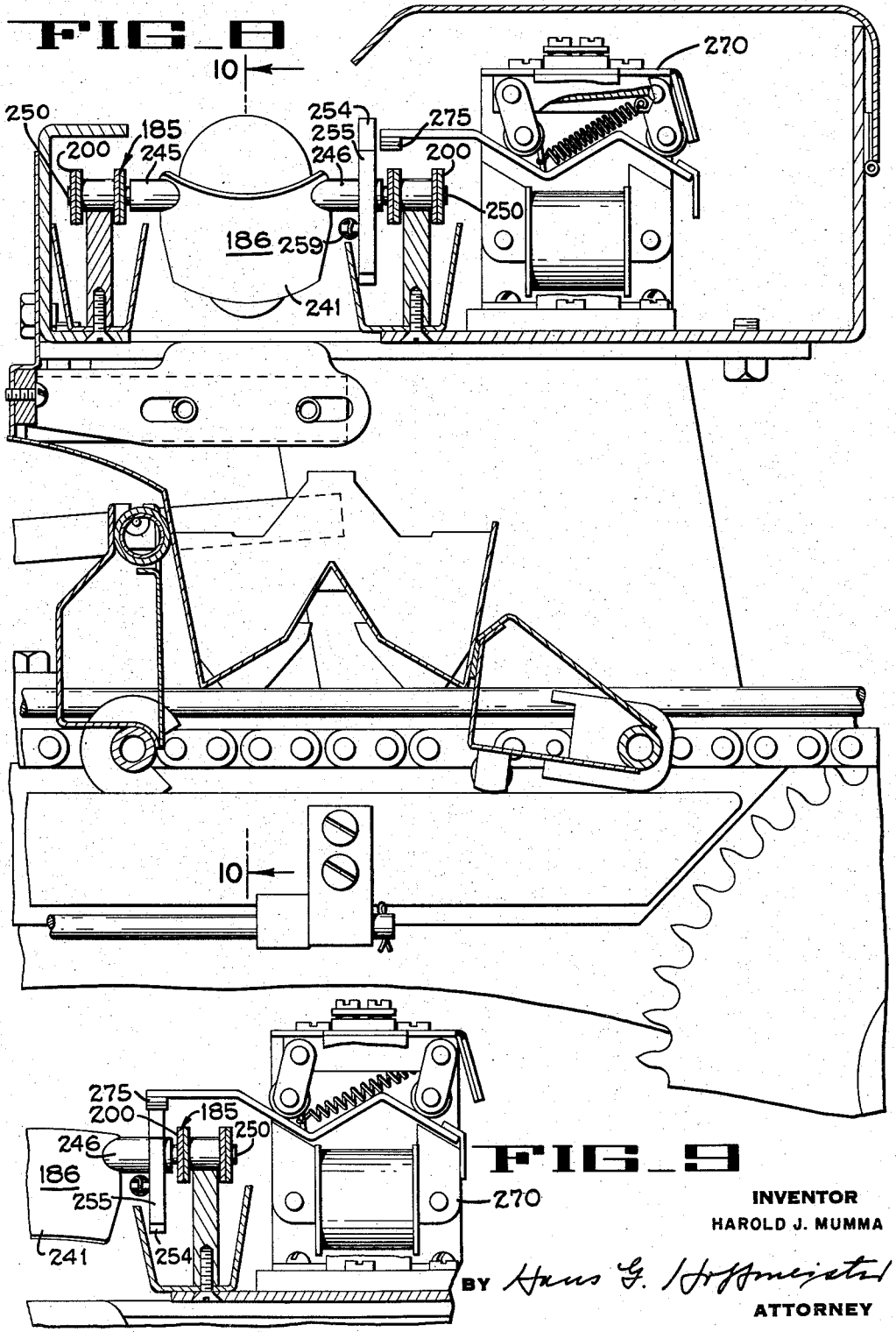

June 20, 1961 H. J. MUMMA 2,989,168
MACHINE FOR HANDLING EGGS
Original Filed Dec. 28, 1953 6 Sheets-Sheet 6
FIG_10
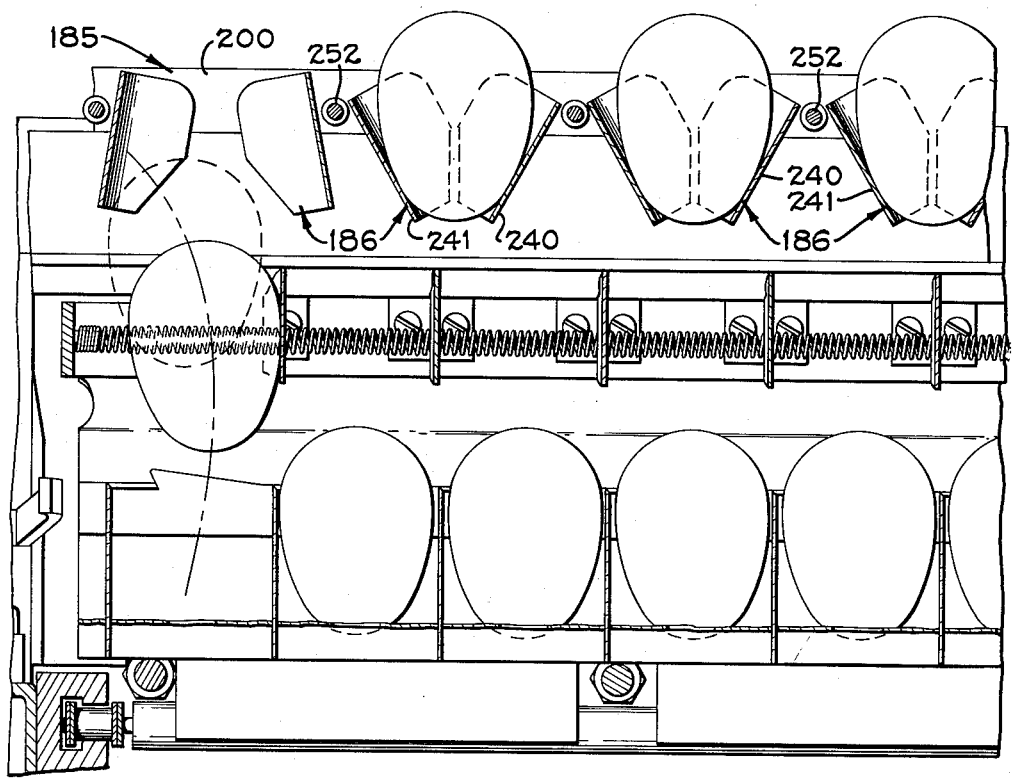
FIG_11
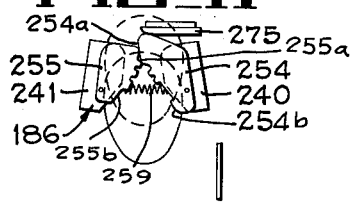
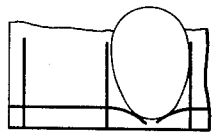
FIG_12
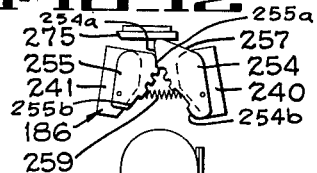
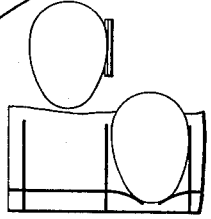
FIG_13
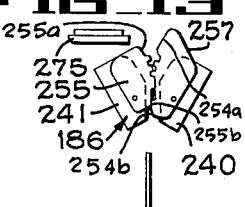
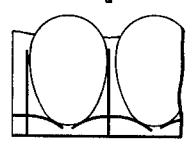
INVENTOR
HAROLD J. MUMMA
BY Hans G. Hoffmeister
ATTORNEY United States Patent Office 2,989,168
Patented June 20, 1961

2,989,168
MACHINE FOR HANDLING EGGS
Harold J. Mumma, Riverside, Calif., assignor to Food Machinery and Chemical Corporation, San Jose, Calif., a corporation of Delaware
Original application Dec. 28, 1953, Ser. No. 400,466, now Patent No. 2,895,274, dated July 29, 1959. Divided and this application May 15, 1959, Ser. No. 813,405
6 Claims. (Cl. 198—131)

The present application is a division of application Ser. No. 400,466 filed Dec. 28, 1953, now Patent No. 2,895,274.

This invention relates to machines for handling articles, such as egges. More particularly, the present invention relates to an improved conveyor for carrying articles to a predetermined position and discharging the articles.

An object of the present invention is to provide an improved conveyor.

Another object is to provide an efficient mechanism for controlling the discharge of articles from a conveyor.

Another object is to provide an improved article carrier for a conveyor.

These and other objects of the present invention will be apparent from the following description of the accompanying drawings which illustrate a preferred embodiment thereof and wherein:

FIG. 1 is a schematic plan view of a complete egg handling machine of the invention embodying the conveyor of the present invention.

FIG. 2 is a schematic side elevation of the machine shown in FIG. 1.

FIG. 3 is a schematic side elevation of the same machine viewed from the side opposite to FIG. 2.

FIGS 4A and 4B are the left and right halves respectively, of a fragmentary schematic perspective illustrating the mechanical power trains used in the machine of the invention.

FIG. 5 is a side elevational view of an egg lowering mechanism, with part of the distributing conveyor of the present invention disposed underneath and shown in longitudinal vertical section.

FIG. 6 is a fragmentary perspective of one of the egg supporting buckets carried by the distributing conveyor of the present invention.

FIG. 7 is a perspective of a battery of six egg release solenoids provided along the distributing conveyor at each of the eighteen packing stations.

FIG. 8 is a fragmentary transverse section taken along line 8—8 of FIG. 7.

FIG. 9 is a detail view illustrating part of the mechanism shown in FIG. 8 in a different operational position.

FIG. 10 is a fragmentary longitudinal section through the terminal run of the distributing conveyor taken along line 10—10 of FIG. 8.

FIGS. 11, 12 and 13 are schematic detail views showing consecutive operational positions of the mechanisms illustrated in FIG. 10.

Having first reference to FIGS. 1, 2 and 3, the embodiment of the conveyor of the invention that is illustrated in the accompanying drawings is particularly adapted for use in an egg processing machine which comprises six candling stations 150 individually identified by the reference numerals 151, 152, 153, 154, 155 and 156. Every one of said stations is provided with a platform 157 upon which the candler receives cases or crates of eggs from an inclined roller conveyor 158. At each of said stations, an operator examines the eggs for external appearance, views them against a torch (not shown) to determine their internal condition, and places those found acceptable upon one of eight superposed racks or chutes of a storage unit 160 (FIG. 3), according to their individual quality, while depositing eggs that are broken, excessively dirty, or otherwise unfit for human consumption into cardboard containers (not shown) placed upon trays 161 that are supported in candelabrum fashion at the right end of the storage unit 160.

The quality of each egg is recorded in a memory device 170 (FIG. 1), disposed in a cabinet 172, and then the egg is delivered from the storage unit 160 to upwardly moving cups of a conveyor 162 (FIG. 4A) which deposits each egg separately in a weighing mechanism 180 (FIG. 1). The weight of each egg is recorded in the memory device 170 and then the egg is lowered by a transfer mechanism 182 (FIG. 5) into a cup 186 of the distributing conveyor 185 of the present invention.

The details of construction and operation of the candling and storage unit 160, the conveyor 162, the memory device 170, the weighing mechanism 180, and the transfer mechanism 182 are completely disclosed in the above mentioned patent.

The distributing conveyor 185 comprises a pair of parallel, transversely spaced endless chains 200 (FIG. 4A) that are trained at the trailing end of the conveyor upon a pair of idler sprockets 201 and 202, respectively, which are mounted upon a common transverse shaft 203 that is rotatably supported from the machine frame adjacent the cabinet 172 of the hereinbefore mentioned memory device 170. An initial horizontal portion of the upper run 204 of the distributing conveyor passes adjacent the hereinbefore described weighing mechanisms 180 comprised in the machine, with one of its chains enmeshed with the drive sprockets 205 (FIG. 4A) of the mechanisms that are associated with the weighing mechanisms 180. Beyond the last of the weighing mechanisms, the chains of the distributing conveyor pass, and are turned downwardly over, a pair of idler sprockets 208 and 209 to form a short descending run 210. The lower end of said descending run is determined by another pair of idler sprockets 212 and 213 whose bottom segments engage the sprocket chains from above. Beyond said last-mentioned pair of sprockets, the upper run of the distributing conveyor reverts to horizontal disposition and passes over the carbon supply conveyors of eighteen juxtaposed packing stations 190 (FIG. 1). Beyond the last of the packing stations both chains are trained downwardly over a pair of drive sprockets 215 and 216 (FIG. 4B) that are mounted upon a common drive shaft 217 which is rotatably supported in the machine frame. Said shaft 217 is driven from an electric motor 218, disposed below the conveyor chains, by means of an endless sprocket chain 219 that transmits the rotary power of the motor to a sprocket 220 which is firmly mounted upon the shaft 217. Below the drive sprockets 215 and 216 the chains of the distributing conveyor are trained about another pair of idler sprockets 224 and 225, and after forming a horizontal run 226, they rise from below another pair of idler sprockets 228 and 229 to the level of the bottom segments of the initially mentioned idler sprockets 201 and 202 (FIG. 4A) at the trailing end of the conveyor reverting to horizontal disposition over yet another set of idler sprockets 230 and 231 that maintains them at the defined level for operational engagement with the lower segments of said idler sprockets 201 and 202.

Held between the chains 200 in an endless sequence are the hereinbefore mentioned egg supporting buckets 186. Said buckets have the form of downwardly converging, open-ended shells that are adapted to receive and support eggs at their diverging upper ends and which may be operated to drop said eggs through their lower ends at predetermined points along the upper run of the distributing conveyor. For this purpose, each of said buckets 186 is formed by two segments in the form of semi-cylindrical shells 240 and 241 that face each other with their concave surfaces (FIG. 6).

Adjacent their side edges, and near their upper ends, each of said shells is provided with outwardly directed tubular bosses 243, 244 and 245, 246, respectively, within which are rotatably received transversely aligned elongated pivot pins 250 of the two parallel sprocket chains 200. Intermediately of each two consecutive buckets, the parallel chains of the distributing conveyor may be connected by cross rods 252, as shown. The bosses 244 and 246 on the right side of the bucket segments, when viewed in the direction of movement of the distributing conveyor, carry firmly secured thereto enmeshed gear segments 254 and 255, respectively. As shown best in FIGS. 6 and 11–13, the gear segments are provided with upper cooperating abutment surfaces 254a and 255a, respectively, and lower cooperating abutment surfaces 254b and 255b, respectively. The leading gear segment 254 of each bucket forms an upwardly directed actuating nose 257 whose leading surface is rearwardly slanted as shown at 258. A suitable spring 259 tensioned between points of said segments 254 and 255 below the bosses 244 and 246 urges the semi-cylindrical shells of each bucket into the closed position illustrated in FIGS. 5 and 6 wherein the surfaces 254b and 255b are in abutting engagement and the shell sections 240 and 241 properly support an egg delivered thereinto at the diverging upper end thereof. Arranged adjacent the upper run of the distributing conveyor 185, however, at each of the eighteen packing stations comprised in the exemplary embodiment of the invention are batteries of six solenoids 265, the batteries of solenoids being individually identified by the reference numbers 266 to 271 inclusive (FIG. 7). Each of said solenoids is arranged upon energization to project momentarily an actuating ledge 275 into the path of the noses 257 on the segments 254 of selected egg supporting buckets 186 as they pass over the packing stations (FIGS. 1 and 8). As the rearwardly slanted leading edge 258 of a nose 257 on the segment 254 of a bucket 186 comes against such a ledge 275 in projected position, it forces said segment 254 to swing in clockwise direction as viewed in FIGS. 5 and 6 against the urgency of spring 259 until the surfaces 254a and 255a of segments 254 and 255, respectively, are in abutting relation. When the surfaces 254a and 255a are in abutting relation the associated shell sections converge upwardly (FIGS. 10–12) and the bucket is in open condition. An egg previously retained in the bucket is, thus, released therefrom. Clockwise movement of the leading segment 254 moves the trailing segment 255 enmeshed therewith in counter-clockwise direction and as a result thereof the lower ends of the two semi-cylindrical shells 240 and 241 are forced to swing apart as illsutrated in FIGS. 10–13 and are therefore no longer capable of supporting an egg, so that any egg that may be seated in the bucket at the moment will drop through its opened lower end into a suitable container underneath.

From the foregoing description it will be recognized that the present invention provides a particularly simple, effective conveyor and an efficient mechanism for discharging articles from the conveyor at desired locations.

Having thus described the invention, what I claim as new and desire to protect by Letters Patent is:

1. A conveyor for transporting eggs or the like, comprising a pair of transversely spaced parallel chains, pairs of semi-cylindrical shell sections rotatably supported from said chains with their concave surfaces facing each other, resilient means urging the lower ends of said shell sections toward each other to enable said shell sections to support an egg therebetween, and enmeshed gear segments integral with said shell sections to couple each pair of shell sections for synchronous rotation in opposite direction, and a lower abutment surface on each of said gear segments, the abutment surfaces of each pair of shell sections being arranged to engage each other to limit movement of the associated shell sections toward each other in egg supporting relation.

2. A conveyor for transporting eggs or the like, comprising a chain, a pair of concave shell sections rotatably supported from said chain with their concave surfaces facing each other, resilient means urging the lower ends of said shell sections toward each other to cause said shell sections to form a bucket adapted to support an egg therein, enmeshed gear segments integral with said shell sections to couple said shell sections for synchronous rotation in opposite direction, a nose formed on the leading one of said segments, means advancing said chain, and solenoid operated camming means at a stationary point along said chain operable to project into the path of said nose so as to cause rotation of the leading gear segment of the bucket in a direction opposite to the urgency of said resilient means and thus spread apart the lower ends of its shell sections.

3. A conveyor for transporting eggs or the like, comprising a pair of transversely spaced parallel chains, pairs of semi-cylindrical shell sections rotatably supported from said chains at intervals with their concave surfaces facing each other, resilient means urging the lower ends of each pair of shell sections toward each other to cause said shell sections to form a bucket adapted to support an egg therein, enmeshed gear segments integral with said shell sections to couple each pair of said shell sections for synchronous rotation in opposite direction, a nose formed on each leading gear segment, means advancing said chains, selectively operable actuating means at spaced stationary points along said chains to project temporarily into the path of said noses so as to cause rotation of the leading gear segment of a bucket passing by, in a direction opposite to the urgency of said resilient means, and thus spread apart the lower ends of its shell sections to open the bucket to permit an egg supported therebetween to drop from the bucket, and upper abutment surfaces on the cooperating gear segments of each bucket arranged to engage each other to determine the open position of the shell sections thereof.

4. A conveyor for transporting eggs or the like, comprising a pair of transversely spaced parallel chains, concave shell sections rotatably supported from said chains with their concave surfaces facing each other, resilient means urging the lower ends of said shell sections toward each other to cause said shell sections to form a bucket adapted to support an egg therein, enmeshed gear segments integral with said shell sections to couple said shell sections for synchronous rotation in opposite direction, means advancing said chains, a nose formed on the leading one of said segments, a solenoid arranged at a predetermined point along said chains, said solenoid having an armature arranged upon energization of the solenoid to project into the path of said nose so as to cause rotation of the leading segment of said bucket in a direction opposite to the urgency of said resilient means and in this manner spread apart the lower ends of said shell sections, means operable to briefly energize said solenoid, and means supporting said armature in such a manner as to maintain it in projected position upon engagement with the nose of the bucket, even after said solenoid has been deenergized.

5. An egg transporting conveyor comprising a pair of transversely spaced parallel chains, pairs of concave shell sections rotatably supported from said chains with their concave surfaces facing each other in cooperative relation, resilient means urging the lower ends of said cooperating shell section toward each other to enable said shell sections to support an egg therebetween, enmeshed gear segments integral with said shell cooperating shell sections to couple said shell sections for synchronous rotation in opposite direction, a first abutment surface carried by each of said gear segments and arranged to engage each other to limit movement of cooperating shell sections toward each other in egg retaining relation, and second abutment surfaces carried by said gear segments and arranged to engage each other to limit movement of cooperating shell sections away from each other into egg releasing relation.

6. An egg transporting conveyor comprising a pair of transversely spaced parallel chains, pairs of concave shell sections rotatably supported by said chains in cooperative relation with their concave surfaces facing each other, each pair of cooperating shell sections providing a bucket, resilient means urging the lower ends of each pair of said shell sections toward each other to enable said bucket to support an egg therein, enmeshed gear segments integral with the shell sections of each bucket to couple said shell sections for synchronous rotation in opposite directions, a first abutment surface carried by each of the gear segments of each bucket, the first abutment surfaces of each bucket being arranged to engage each other to limit movement of said shell sections thereof toward each other in egg retaining relation, a second abutment surface carried by each of the gear segments of each bucket, the second abutment surfaces of each bucket being arranged to engage each other to limit movement of said shell sections thereof away from each other into egg releasing relation, a nose formed on each leading gear segment, a solenoid having an armature arranged upon energization of the solenoid to project into the path of said noses so as to engage one of said noses and cause rotation of the leading shell section of the associated bucket in a direction opposite to the urgency of said resilient means and in this manner spread apart the lower ends of the shell sections of said bucket, means operable to briefly energize said solenoid, and means supporting said armature in a manner as to maintain it in projected position upon engagement with the nose of a bucket, even after said solenoid has been deenergized.

References Cited in the file of this patent

UNITED STATES PATENTS

| | | |
|---|---|---|
| 630,799 | Decker | Aug. 8, 1899 |
| 2,063,230 | Crady | Dec. 8, 1936 |
| 2,803,333 | Freeman | Aug. 20, 1957 |